US012203425B2

(12) United States Patent
Syed et al.

(10) Patent No.: US 12,203,425 B2
(45) Date of Patent: Jan. 21, 2025

(54) METHOD AND SYSTEM FOR MEASURING FUELING QUANTITY VARIATION DURING MULTIPULSE FUEL INJECTION EVENT

(71) Applicant: Cummins Inc., Columbus, IN (US)

(72) Inventors: Jalal Syed, Indianapolis, IN (US); Donald J. Benson, Columbus, IN (US); David Michael Carey, Bend, OR (US); Sanjay Manglam, Franklin, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/160,757

(22) Filed: Jan. 27, 2023

(65) Prior Publication Data

US 2023/0175452 A1 Jun. 8, 2023

Related U.S. Application Data

(63) Continuation of application No. PCT/US2020/044064, filed on Jul. 29, 2020.

(51) Int. Cl.
*F02D 41/38* (2006.01)
*F02D 41/40* (2006.01)

(52) U.S. Cl.
CPC ..... *F02D 41/3809* (2013.01); *F02D 41/3818* (2013.01); *F02D 41/401* (2013.01); *F02D 41/403* (2013.01)

(58) Field of Classification Search
CPC ..... F02D 2041/1433; F02D 2200/0614; F02D 2200/0618; F02D 2250/04; F02D 41/1401; F02D 41/2467; F02D 41/3809; F02D 41/3818; F02D 41/401; F02D 41/403; F02D 41/406
See application file for complete search history.

(56) References Cited

U.S. PATENT DOCUMENTS

| | | | |
|---|---|---|---|
| 7,552,709 | B2 | 6/2009 | Fujii |
| 7,628,146 | B2 | 12/2009 | Kloppenburg et al. |
| 7,917,281 | B2 * | 3/2011 | Yamada ................ F02D 41/402 123/456 |
| 8,646,322 | B2 | 2/2014 | Henner et al. |
| 8,863,727 | B2 | 10/2014 | Jalal et al. |
| 10,066,563 | B2 * | 9/2018 | Jalel .................... F02D 41/2096 |
| 10,167,809 | B1 | 1/2019 | Domenech-Llopis et al. |
| 10,669,965 | B2 * | 6/2020 | Braun ..................... F02D 41/34 |

(Continued)

FOREIGN PATENT DOCUMENTS

| | | |
|---|---|---|
| EP | 1860312 | 3/2009 |
| GB | 2344376 | 6/2000 |
| WO | 2016011111 | 1/2016 |

OTHER PUBLICATIONS

International Search Report and Written Opinion, PCT Appln. No. PCT/US20/44064, Oct. 15, 2020, 4 pgs.

*Primary Examiner* — Carl C Staubach
(74) *Attorney, Agent, or Firm* — Taft, Stettinius & Hollister LLP

(57) ABSTRACT

The present invention provides a method for analyzing and optimizing the injection of fluid into an internal combustion engine via a common rail system. Once various injection parameters are determined for a given injection system, these data may be used to model the effect of sequential injection events for the system. A processer can then be used to run the model and to adjust sequential fuel injection events to optimize engine performance and fuel usage.

15 Claims, 11 Drawing Sheets

(56) References Cited

U.S. PATENT DOCUMENTS

| | | | | |
|---|---|---|---|---|
| 2009/0177366 | A1* | 7/2009 | Achleitner | F02D 41/247<br>123/456 |
| 2012/0303245 | A1* | 11/2012 | Wang | F02D 19/0615<br>701/104 |
| 2013/0019842 | A1 | 1/2013 | Shaver et al. | |
| 2014/0283792 | A1* | 9/2014 | Benson | F02D 41/3809<br>123/478 |
| 2016/0017837 | A1* | 1/2016 | Carey | F02D 41/402<br>123/480 |
| 2016/0084189 | A1* | 3/2016 | Pursifull | F02M 63/0285<br>123/456 |
| 2020/0271068 | A1* | 8/2020 | Dodis | F02D 19/0642 |
| 2022/0145840 | A1* | 5/2022 | Bollinger | G05B 13/027 |
| 2022/0381191 | A1* | 12/2022 | Staykov | F02D 41/402 |

* cited by examiner

FIG. 7A
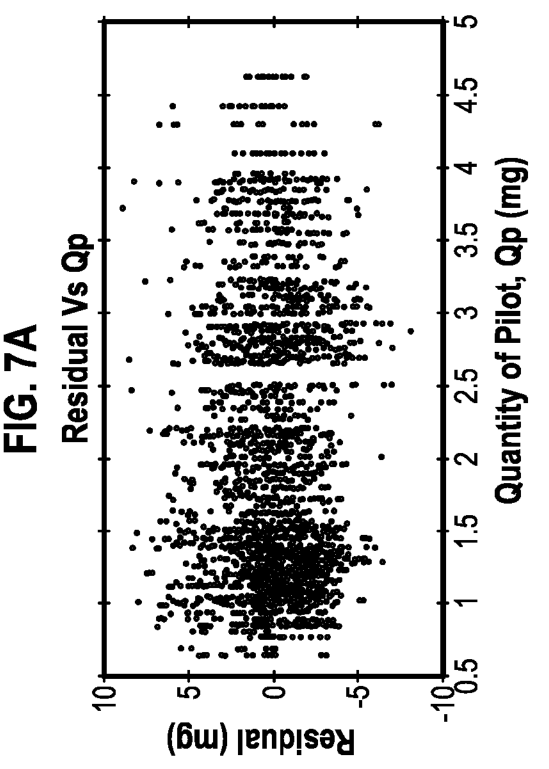
FIG. 7B
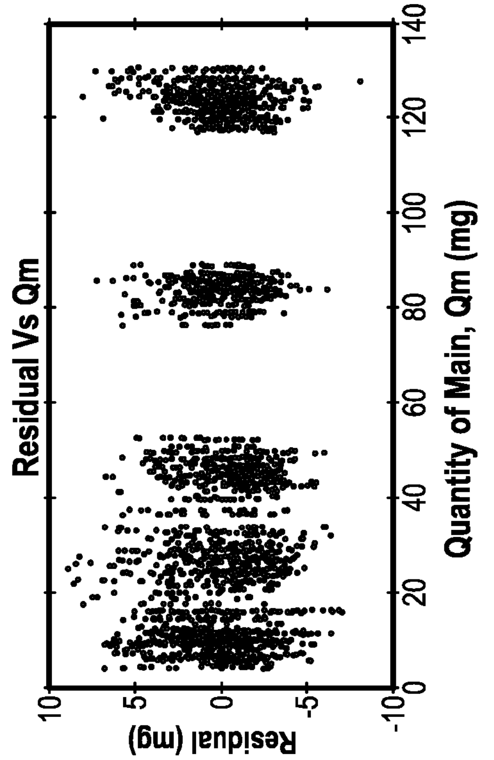
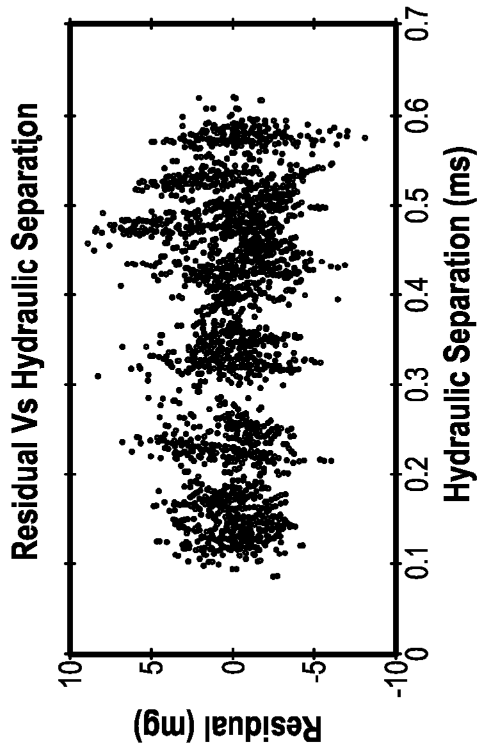
FIG. 7C
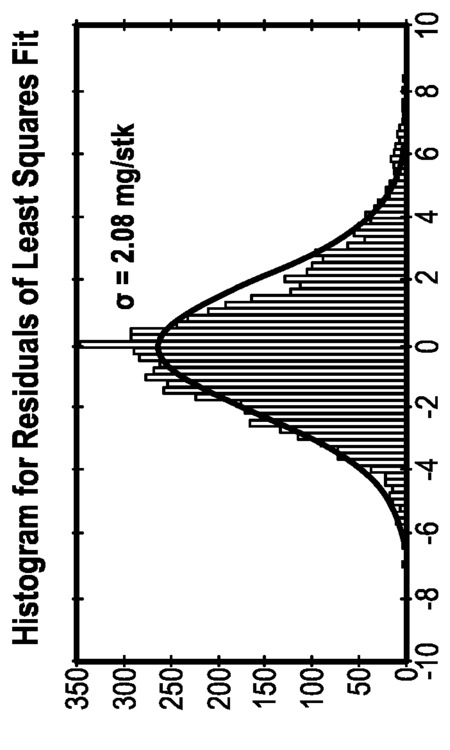
FIG. 7D

Boxplot of c1, c2, c3, c4, c5, c6, c7
Summary Report

Distribution of Data by Group
Compare the center and variability across samples. Identify any outliers.

| Statistics | c1 | c2 | c3 | c4 | c5 | c6 | c7 |
|---|---|---|---|---|---|---|---|
| N | 6 | 6 | 6 | 6 | 6 | 6 | 6 |
| Mean | 11.171 | 5.0514 | -0.26118 | 0.85430 | -0.28219 | 14.176 | 4.531E-04 |
| StDev | 1.6597 | 1.4687 | 0.35604 | 0.76437 | 0.33244 | 1.5658 | 0.0085208 |
| Minimum | 9.2935 | 3.2371 | -0.68935 | 0.015133 | -0.55692 | 12.300 | -0.010600 |
| Maximum | 13.362 | 7.5403 | 0.20377 | 2.2862 | 0.36322 | 16.140 | 0.013869 |

1000

METHOD AND SYSTEM FOR MEASURING FUELING QUANTITY VARIATION DURING MULTIPULSE FUEL INJECTION EVENT

CROSS-REFERENCE TO RELATED APPLICATIONS

The present application is a continuation of PCT Patent Application No. PCT/US20/044064 filed on Jul. 29, 2020, which is incorporated herein by reference in its entirety.

FIELD OF THE DISCLOSURE

The present disclosure generally relates to fuel injectors, particularly high pressure fuel injectors for internal combustion engines.

BACKGROUND OF THE DISCLOSURE

Fuel injectors are commonly used to control the flow of fuel into each cylinder of an internal combustion engine. The fuel injector is generally designed to move a valve to open a port to thereby spray a quantity of fuel into a corresponding cylinder, and then move the valve to close the port to stop the spray of fuel. Certain fuel injection systems are configured to spray fuel into the cylinder in multiple shots within a single cycle of the engine, instead of a single shot per cycle, which may be referred to as multipulse fuel injection. Typically, multipulse fuel injection include two pulses (e.g., a "pilot" pulse followed by a "main" pulse) or three pulses (e.g., a pilot pulse followed by a main pulse followed by a "post" pulse) separated by set periods of time, though many other combinations of two, three, or more pulses are common.

The fundamental problem in a multipulse event is that pulses that follow other pulses are affected by preceding pulses. For optimal fuel economy (based on brake-specific fuel consumption, BSFC), emission (based on the amount of NOx being emitted) and noise and vibration (or noise, vibration, and harshness, NVH) reasons, the pilot+main operation are typically positioned with a very small separation (time interval between the pulses). The fueling interaction effect is large at small separation. Due to the fueling interactions, the subsequent pulses (either a main or another pilot) will deliver more, or less fuel than an equivalent single-pulse event, depending on pulse separation and accumulator pressure, pilot injection quantity and main injection quality. The effect is compounded by the addition of more pulses. In some cases, a close pilot-to-main separation may result in an armature of the fuel injection system to "bounce" due to multiple injections taking place.

While it is possible to account for this pulse interaction, to some extent, in the calibration of combustion maps that command injection quantities, rail pressure, and pulse separations, this approach is far from ideal. This type of calibration work is typically performed with nominal (or a small sample of) injector hardware. The existing approach has been an open-loop fueling interaction compensation which suffers from performance changes of the fuel injector due normal production variation and age-related drift. This variability negatively impacts the intended performance of the engine in terms of torque output for a given fueling command, emissions, NVH and fuel economy.

Accordingly, there remains a need for further contributions in this area of technology. Aspects of the invention disclosed herein provide for better and more efficient control of these events.

SUMMARY OF THE DISCLOSURE

Various embodiments of the present disclosure relate to methods and systems for optimizing fluid injection into an engine via a common rail system. The method includes receiving, by a processing unit from a sensor, an amount of fueling interaction between a pilot pulse and a main pulse during a multipulse fuel injection event; determining, by the processing unit, an adjustment to be made to the pilot pulse or the main pulse using a fueling interaction model involving the multipulse fuel injection event based on the amount of fueling interaction; and performing, by the processing unit, the determined adjustment on the pilot pulse or the main pulse.

The method may further include increasing, by the processing unit, a separation between the pilot pulse and the main pulse to allow the sensor to measure the amount of fueling interaction between the pilot pulse and the main pulse. The determined adjustment may include a change in fuel quantity to be delivered during the main pulse. The adjustment may be determined using a fueling interaction model which involves as an input one or more of: an initial pressure, a commanded pulse separation, a fueling quantity of the pilot pulse, or a fueling quantity of the main pulse.

The method may further include adapting the fueling interaction model based on operating conditions and the fueling interaction, the operating conditions including one or more of an initial pressure, a commanded pulse separation, a fueling quantity of the pilot pulse, or a fueling quantity of the main pulse. The method may further include temporarily deactivating a pump coupled with the common rail system when the amount of fueling interaction is being measured. The fueling interaction model may include a lookup table. The amount of fueling interaction may be filtered through Kalman filter to produce a predicted fueling interaction value.

The method may further include comparing, by the processing unit, the predicted fueling interaction value with a target main pulse fuel quantity and determining an adjusted on-time fuel injection. When the target main pulse fuel quantity is greater than the predicted fueling interaction, an adapted fuel quantity may be calculated by calculating a difference between the target main pulse fuel quantity and the predicted fueling interaction, the adapted fuel quantity is used to determine the adjusted on-time fuel injection. Also, when the target main pulse fuel quantity is not greater than the predicted fueling interaction, an adjustment fuel quantity may be calculated based on the target main pulse fuel quantity and the predicted fuel interaction, the adjustment fuel quantity is used to determine the adjusted on-time fuel injection. The adjusted on-time may provide the adjusted fuel quantity to be delivered during the main pulse.

An engine fuel system as disclosed herein may include a rail; a plurality of fuel injectors fluidly coupled to the rail, the fuel injectors configured to inject fuel therefrom; a control system comprising at least one sensor and a processing unit operatively coupled to the plurality of fuel injectors, the at least one sensor configured to measure an amount of fueling interaction between a pilot pulse and a main pulse during a multipulse fuel injection event. The processing unit may be configured to: determine an adjustment to be made to the pilot pulse or the main pulse using a fueling interaction model involving the multipulse fuel injection event based on the measured amount of fueling interaction; and perform the determined adjustment on the pilot pulse or the main pulse.

The processing unit may increase a separation between the pilot pulse and the main pulse to allow the sensor to measure the amount of fueling interaction between the pilot pulse and the main pulse. The determined adjustment may include a change in fuel quantity to be delivered during the main pulse. The adjustment may be determined using a fueling interaction model which involves as an input one or more of: initial pressure, commanded pulse separation, pilot pulse fuel quantities, or main pulse fuel quantities. The processing unit may be further configured to adapt the fueling interaction model based on operating conditions of the plurality of injectors and the fueling interaction, the operating conditions including one or more of: an initial pressure, a commanded pulse separation, a fueling quantity of the pilot pulse, or a fueling quantity of the main pulse. The processing unit may be further configured to temporarily deactivate the plurality of injectors coupled with the rail when measuring the amount of fueling interaction.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIGS. 7A through 7D show plots of residuals. FIG. 7A shows Residual versus $Q_p$; FIG. 7B shows Residual versus $Q_m$; FIG. 7C shows Residuals versus Hydraulic Separation; and FIG. 7D shows histogram for residual of a Least Squares Fit.

Figure 1:
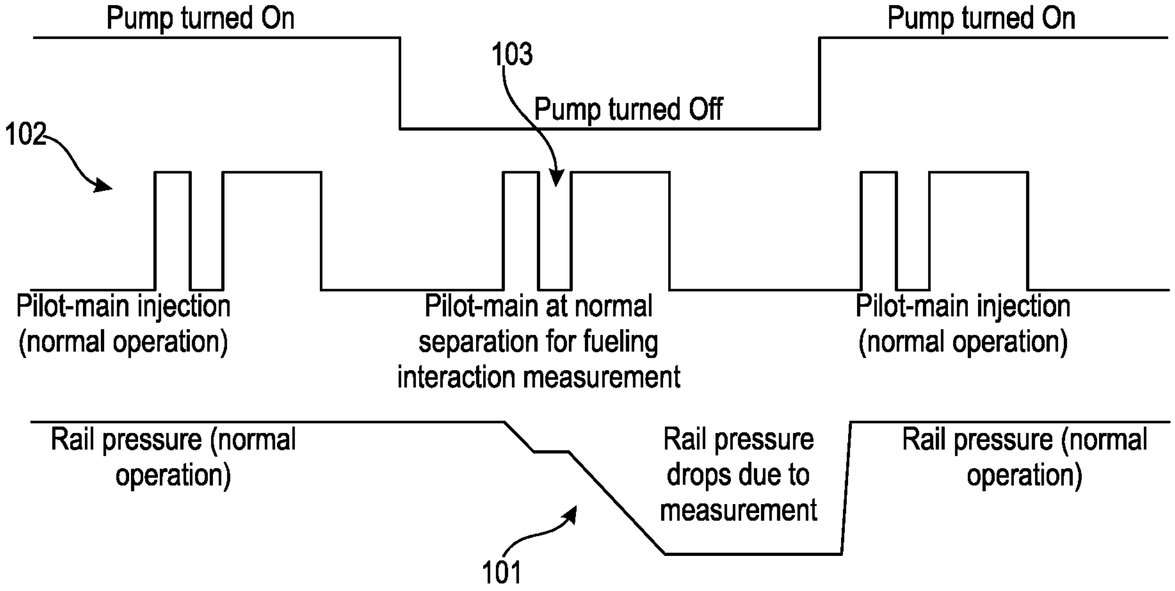
FIG. 1 is a graph illustrating the total rail pressure drop measurement due to a multipulse event at the prescribed normal operation separation.

Corresponding reference characters indicate corresponding parts throughout the several views. Although the drawings represent embodiments of the present invention, the drawings are not necessarily to scale, and certain features may be exaggerated to better illustrate and explain the present invention.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Embodiments and examples in this disclosure provide methods and systems for measuring, adapting and compensating for the quantity variation (fueling interaction) that occurs in following pulses of a multipulse fuel injection event, for injectors with variable characteristics. The embodiments and examples may be implemented in an engine fuel system that includes a rail (also referred to as a "common rail"), a plurality of fuel injectors fluidly coupled to the rail, and a control system coupled to the fuel injectors. The control system may include sensors and a processing unit that receives the measurements taken by the sensors to perform calculations and determinations as further explained herein. The sensors may be any suitable sensors that can measure the quantity variation such as the fueling interaction between pulses. The processing unit, which many be any suitable processor such as a central processing unit, system-on-a-chip, or integrated circuit in any suitable computing device. The processing unit performs the adapting and compensating for the quantity variation.

This compensation, in terms of an on-time and/or separation adjustment, can be created by knowing the injection characteristics of each individual injector, the fueling interaction measurement, the rail pressure and temperature, as well as the commanded on-times and separations between pulses. A system based on the multipulse compensation algorithm disclosed herein uniquely determines and compensates the fueling interaction errors for each injector separately for multipulse operation. The algorithm has the capability to adapt for manufacturing variation and age-related variation. Therefore, the algorithm adds fuel economy benefits, as well as emission and NVH improvements, by enabling tighter fueling and timing accuracy of each pulse during multipulse operation.

Figure 2:
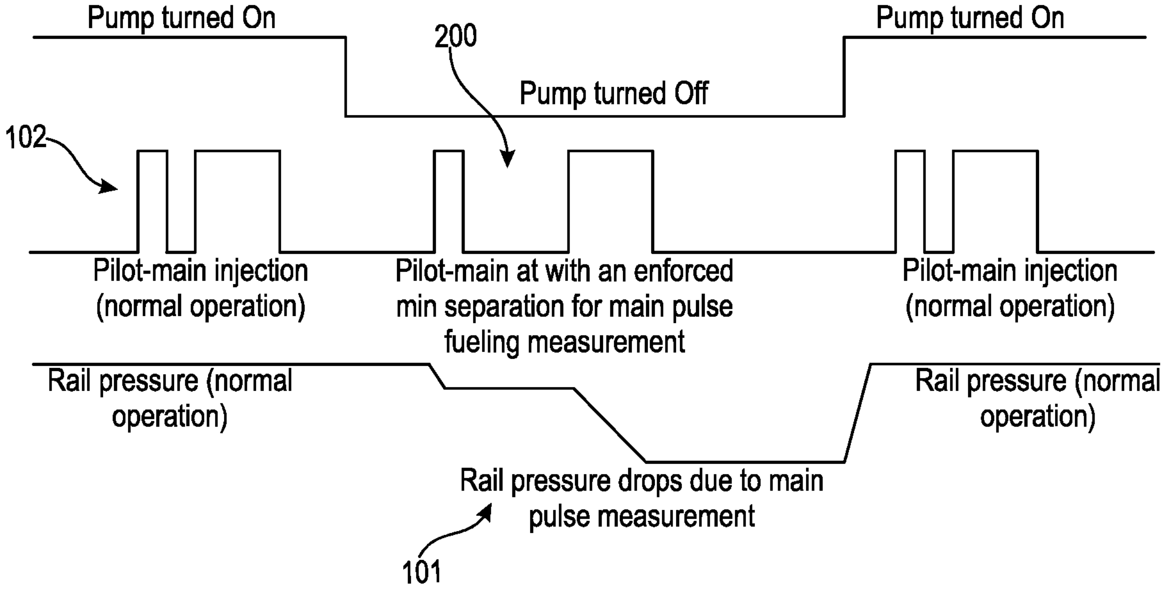
FIG. 2 is a graph illustrating the total rail pressure drop measurement due to a multipulse event with enforced larger separations.

FIGS. 1 and 2 illustrate the measurement strategy for measuring the fueling interaction during pilot+main operation. In FIGS. 1 and 2, when the pump is turned on or activated, a rail pressure 101 is at normal operation and remains at a certain level, as shown. When the pump is turned off or deactivated, the rail pressure 101 drops due to a measurement of pilot+main operation 102. In FIG. 1, a pilot-to-main separation 103 remains the same as during the normal operation. The total pressure drop consists of the pressure drop due to the pilot quantity, main quantity and interaction quantity. The pressure drop is proportional to the fueling quantity via sonic speed and the geometry of the high pressure common rail system.

The total fueling measurement can be written as a summation of the individual contribution as below:

$$Q_{Total1}=Q_{Pilot}+Q_{Main}+Q_{Interaction} \quad \text{(Equation 1)}$$

For a system that employs closed-loop fueling control (CLFC) based on single pulse measurements, the pilot quantity ($Q_{Pilot}$) in the presence of a subsequent pulse can be calculated or measured using methods known in the art. In some examples, sensors are used to measure the pilot quantity ($Q_{Pilot}$). The total quantity ($Q_{Total1}$) is also measured, for example using the sensor. Therefore, the unknowns are the main quantity ($Q_{Main}$) and the interaction quantity ($Q_{Interaction}$). By measuring $Q_{Main}$, one can calculate the $Q_{Interaction}$ using equation (1). Referring now to FIG. 2, in order to more accurately measure the main quantity ($Q_{Main}$), a larger separation 200 than the separation 103 in FIG. 1 is enforced between the pilot and main pulse in the pilot+main operation 102 such that the fueling interaction is approximately zero. The pulse separation 103 between pilot and main is only altered to a larger separation 200 just for the measurement purpose of main quantity ($Q_{Main}$) as shown in FIG. 2. The total fueling measurement ($Q_{Total2}$), as depicted in FIG. 2, is written as:

$$Q_{Total2}=Q_{Pilot}+Q_{Main} \quad \text{(Equation 2).}$$

In equation (2), the total quantity ($Q_{Total2}$) has no contributions from the fueling interactions, i.e. $Q_{Interaction}=0$, as the pilot and main are placed further apart where there is no detectable pulse to pulse interaction. Therefore, the main quantity ($Q_{Main}$) can be calculated based on the equation (2) by subtracting the pilot quantity ($Q_{Pilot}$) from the total fueling measurement ($Q_{Total2}$).

Once the main quantity ($Q_{Main}$) is measured, the fueling interaction ($Q_{Interaction}$) at close separation is calculated using equation (1) by subtracting the pilot quantity ($Q_{Pilot}$) and main quantity ($Q_{Main}$) from total quantity ($Q_{Total1}$) as follows:

$$Q_{Interaction}=Q_{Total1}-Q_{Pilot}-Q_{Main} \quad \text{(Equation 3).}$$

Experience with fueling interactions shows that subsequent pulses (either a main or a pilot) will deliver more, or less fuel, than an equivalent single-pulse event. Test data and/or injector simulations in conjunction with system identification techniques, is sued to create a fueling interaction model involving multipulse injection events. Inputs to this model may include operating conditions such as one or more of the following: initial pressure, commanded pulse separation, commanded pilot quantities (fueling quantities of the pilot pulse), or main quantities (fueling quantities of the main pulse). Model parameters may include injector characteristics such as: hydraulic injection duration, start-of-injection delay, and end-of-injection delay, etc. Model outputs may include the actual fuel quantity delivered and the actual timing of the second pulse. If desired, other injection parameters such as start-of-injection, end-of-injection, duration, or centroid of the injection pulse may also be formulated as outputs.

Figure 3:
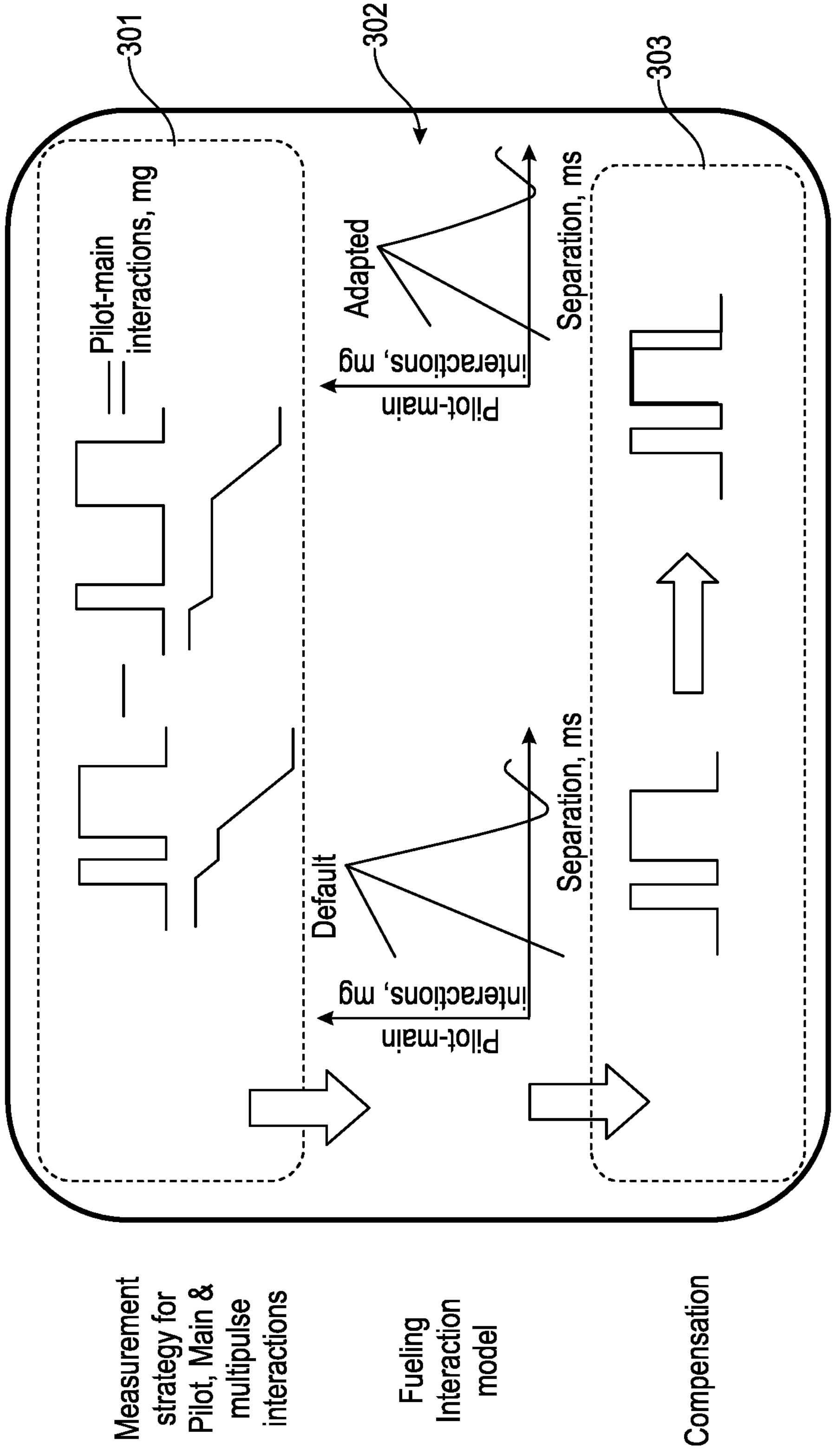
FIG. 3 is a flowchart showing an embodiment of a software algorithm executed by the control unit in order to control the timing and volume of multipulse injection of fuel.

FIG. 3 illustrates a flowchart showing an embodiment of a software algorithm executed by the control unit in order to control the timing and volume of multipulse injection of fuel. In the topmost block 301, the measurement strategy for the pilot, main, and multipulse interactions are determined, see equation (3) from the above. In the middle block 302, a fueling interaction model is created such that the model is configured to be adapted for manufacturing variation and age-related variation, for example, such that the adapted pilot-to-main interactions are lower than the default pilot-to-main interactions. In the bottom block 303, the fueling interaction model is compensated for the fueling interaction errors by changing the timing of the pulses, e.g. by shortening the duration of the main pulse (as shown in FIG. 3) and/or shifting when the pulses take place (earlier or later, for example).

Some examples of the experiments and simulations which can be performed according to the present disclosure are described below.

In one example, a rig testing performed. The effect of the pilot pulse on mass of the main quantity of fuel injected in a multiple commanded fuel injection event in a single cylinder event is measured. Variables that are thought to influence this parameter include: the quantity of the pilot pulse, the separation between pulses within the commanded fuel injection, the rail pressure, and the characteristics of the individual fuel injector.

Multiple test plans are conducted using six (6) close-to-nominal injectors. The specific variables varied are as follows:

1. Quantity of Pilot: 1 mg to 5 mg (2 mg)
2. Quantity of Main: 4 mg to 130 mg (4 mg to 130 mg)
3. Hydraulic Separation: 0.05 ms to 1 ms (0.05 ms to 0.7 ms)
4. Rail Pressure: 500 bar to 2100 bar (500 bar and 1500 bar)

Collecting data on 840 test points on each of 3 runs produces a dataset comprising 2520 datapoints per injector. The values in parentheses above have been used to obtain the 2520 datapoints shown in the figures.

Figure 4B:
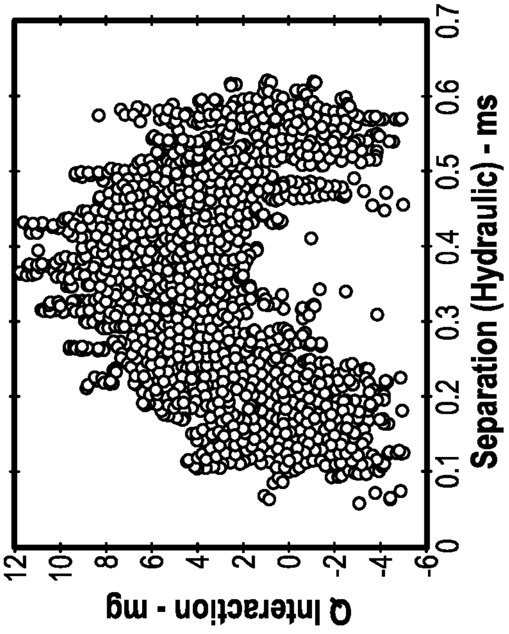
FIG. 4B is a plot of separation (ms) verses Q interaction (mg), data as collected minus the data collected at very low separation times.
Figure 4A:
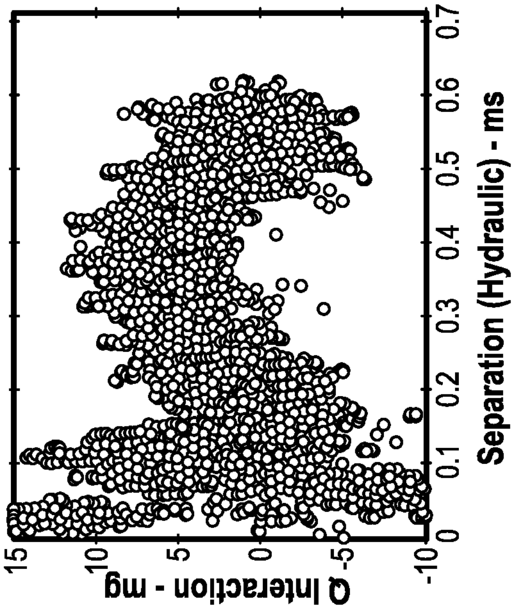
FIG. 4A is a plot of separation (ms) verses Q interaction (mg), data as collected.

Then, the rig testing data is analyzed. Referring now to FIGS. 4A and 4B, the Q interactions expressed in milligrams (mg) are measured versus the change in hydraulic separation time expressed in milliseconds (ms). FIG. 4A shows the raw data obtained, and FIG. 4B shows the raw data shown in FIG. 4A after being edited to remove the data points collected at very low separation time. The data shown in FIG. 4B is subject to further analysis as explained below.

Figure 4C:
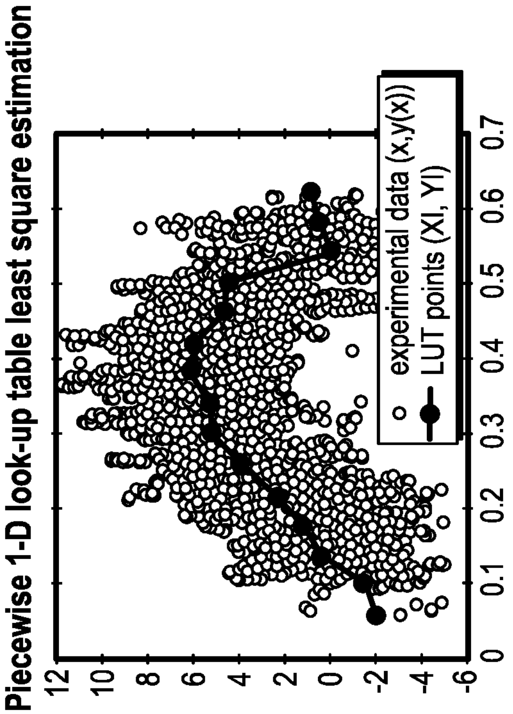
FIG. 4C is the piecewise 1-D look-up table least square estimation superimposed on the plot of FIG. 4B

Referring now to FIG. 4C, a representation is shown of select points that are used to generate a base lookup table based on the data shown in FIG. 4B. The values for the lookup table are created by performing a 1-D least squares fit with a resolution of 15 points (shown joined by a contiguous white line) with a separation of 0.05 to 0.7 ms per test plan. This lookup table may be referred to as a "base lookup table" because this base lookup is computed to be used to estimate the coefficients and the final lookup where the effects of the quantity of pilot pulse $Q_p$, the quantity of main pulse, $Q_m$, separation therebetween, and the rail pressure are considered. The data used in this fit is the same data presented in FIG. 4B.

A model is subsequently developed to predict the effects of multiple injection events on each other using the following equation (Equation 4):

$$Q_p = V_{gain} * \left(Q_i + \frac{Q_{i+1} - Q_i}{S_{i+1} - S_i} * (S_p - S_i - H_{offset})\right)$$

In equation (4), $V_{gain}$ accounts for vertical scaling, and $H_{offset}$ accounts for any horizontal shift in the data. S in the equation stands for hydraulic separation, measured in ms, and Q stands for the interaction, measured in mg. Q versus S is the basis for a lookup table based on 10 to 20 calibratable breakpoints. $Q_p$ and $S_p$ are to be determined based on the measurements or calculations of $Q_i$, $Q_{i+1}$, $S_i$, and $S_{i+1}$.

The following equation (Equation 5), based on equation (4), is then calculated:

$$Q_{Interaction} = Gain_{PilotQty} * \left(Gain_{MainQty} + C_P * \frac{P^{\left(\frac{1}{3}\right)}}{1000}\right) * \left(Table_{k-1} + \frac{Table_k - Table_{k-1}}{Sep_k - Sep_{k-1}} * (Sep_{Msmt} - Sep_{k-1} - C_{\phi})\right)$$

where $Q_{Interaction}$ is the quantity of fueling interaction, $Gain_{PilotQty}$ is the gain due to pilot quantity, $Gain_{MainQty}$ is the gain due to main quantity, P is the pressure, $Table_{k-1}$ and $Table_k$ are the values obtained from lookup table, $Sep_{k-1}$ and $Sep_k$ are the separation between the pilot and main pulses, $Sep_{Msmt}$ is the separation between the pilot and the main injection events where the measurement is taken, $C_p$ is a rail pressure coefficient, and $C_{\phi}$ is an offset coefficient. Each of the variables in equation (4) except for the pressure P and $Sep_{Msmt}$ is referred to as a coefficient to be either determined offline or estimated online, as explained below.

Coefficient Nos. 1 and 2 are the gain attributed to $Q_p$, i.e. pilot quantity; Coefficients Nos. 3, 4, and 5 are the gain attributed to $Q_m$, i.e. main quantity; Coefficient No. 6 is attributed to the gain due to pressure; and Coefficient No. 7 is an offset for horizontal adjustment. The values of Coefficients 3, 5, and 7 are calibrations that are determined offline for appropriated injector data, such as those obtained from the U.S. Department of Energy, for example. The values of Coefficients 1, 2, 4, and 6 are estimated using pressure drop measurements, for example as measured using a flowmeter. Examples of such flowmeters to be used may include those made by AIC Systems AG in Basel, Switzerland.

$Gain_{PilotQty}$, $Gain_{MainQty}$, and $C_p$ are to be estimated online; $Table_{k-1}$, $Table_k$, $Sep_{k-1}$, $Sep_k$, and $C_{\phi}$ are the calibrations to be determined offline. Based upon the disclosure, it would be understand that different methods of estimation and/or calibration may be used to arrive at the appropriate values, such as by obtaining data from the U.S. Department of Energy and measuring pressure drop measurements as measured using a flowmeter. In some examples, the data is analyzed using a p-value test, where the coefficients that account for greater variability have higher p-values. In order to create a robust model, the coefficients with higher p-values may be chosen to be used to generate a model for the effect of simulations injection events on one another. In addition to p-values, an individual and moving range (I-MR) test may be performed in which the result thereof may exhibit the level of variation in each given variable.

To determine the value for $Gain_{PilotQty}$ in equation (5), the following algorithm may be performed, where $Q_p$=pilot quantity:

$$\text{For } Qp < \text{Qp\_cal: } Gp = x(1) + Qp * \left(\frac{x(2) - x(1)}{Qp_{cal}}\right) \quad (1)$$

$$\text{Else: } Gp = x(2) \quad (2)$$

Figure 5A:
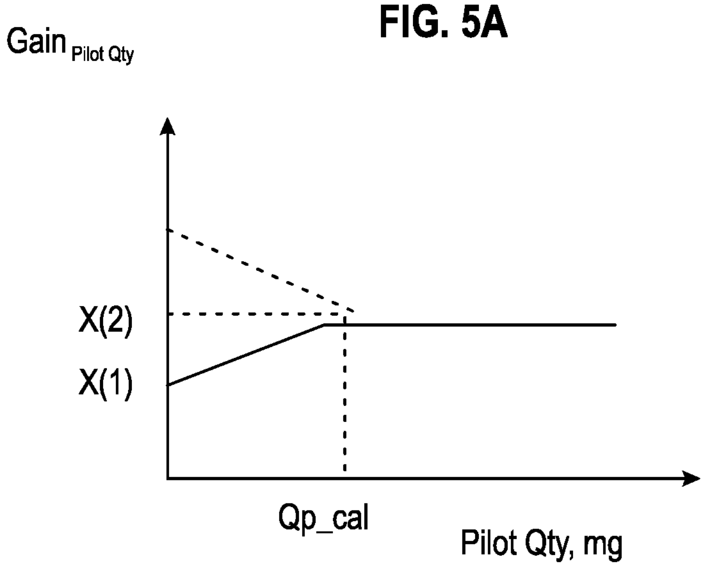
FIG. 5A is a graphic illustration of $Gain_{PilotQty}$, versus Pilot Quantity expressed in mg. Actual and extrapolated y-intercepts determine the values of x(1) and x(2).

In the above algorithm, Qp_cal is defined as the calibratable $Q_p$ threshold. FIG. 5A shows the algorithm graphically depicting how the gain in the pilot quantity is affected by the pilot quantity. The dotted line indicates a higher pressure.

To determine the value for $Gain_{PilotQty}$ in equation (5), the following algorithm may be performed, where $Q_m$=main quantity:

$$\text{For Qm} < Qmid\text{: } Gm = (x(3) - x(5)) * \left(\frac{Qm}{Qmid}\right) * \left(\frac{P^{\left(\frac{2}{3}\right)}}{1000}\right) \quad (1)$$

For $Qmid < Qm < Qmh$: (2)

$$Gm = (x(3) + (x(4) - x(3))) * \left(\frac{Qm - Qmid}{Qmh - Qmid}\right) * \left(\frac{P^{\left(\frac{2}{3}\right)}}{1000}\right)$$

-continued $$\text{For } Qm > Qmh\text{: } Gm = x(4) * \frac{p^{\left(\frac{1}{3}\right)}}{1000} \quad (3)$$

Figure 5B:
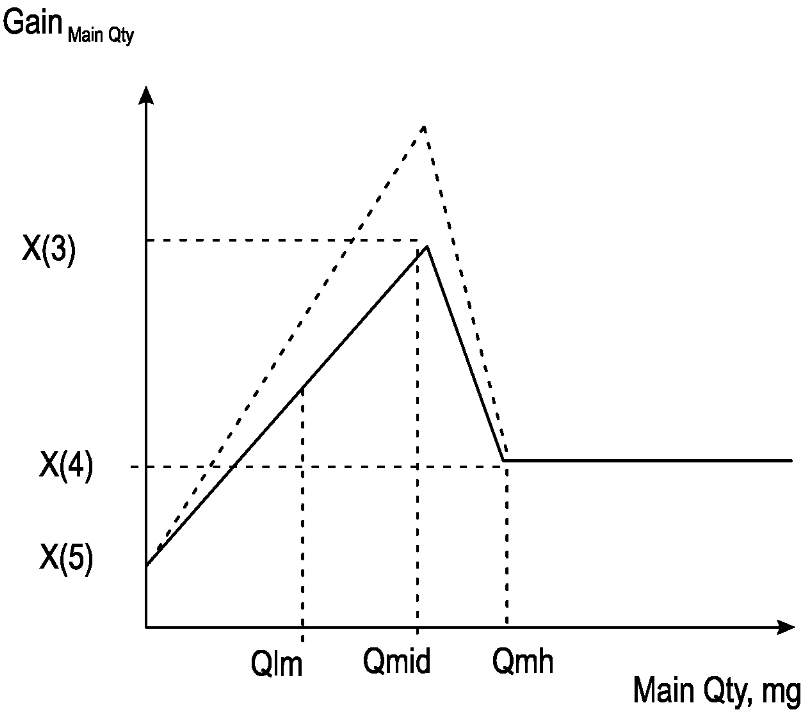
FIG. 5B is a graphic illustration of $Gain_{MainQty}$, versus Main Quantity, expressed in mg. Actual and extrapolated y-intercepts determine the values of x(3), x(4), and x(5); extrapolated x-axis intercepts are used.

FIG. 5B shows the algorithm graphically depicting how the gain in the main quantity is affected by the pilot quantity. The dotted line indicates a higher pressure. In the above algorithms, the values of x(1) through x(5) are coefficients, in which x(1), x(2) and x(4) are estimated online while x(3), x(5) are estimated offline.

Figure 6A:
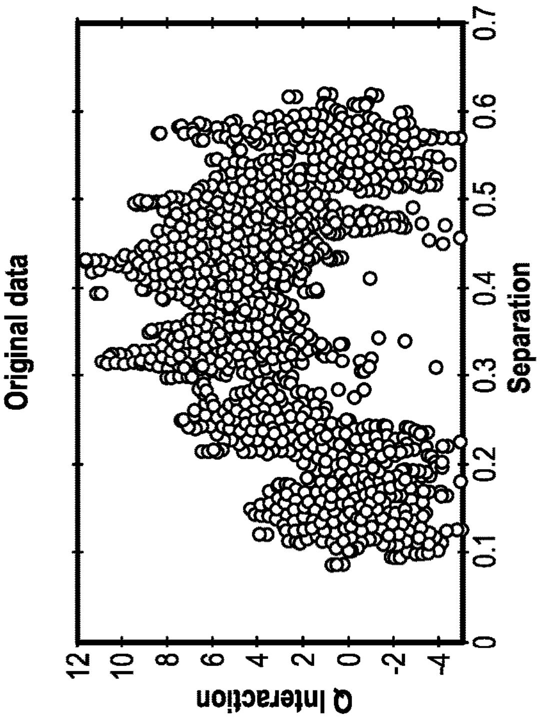
FIG. 6A shows the raw experimental data of separation versus Q interaction.
Figure 6B:
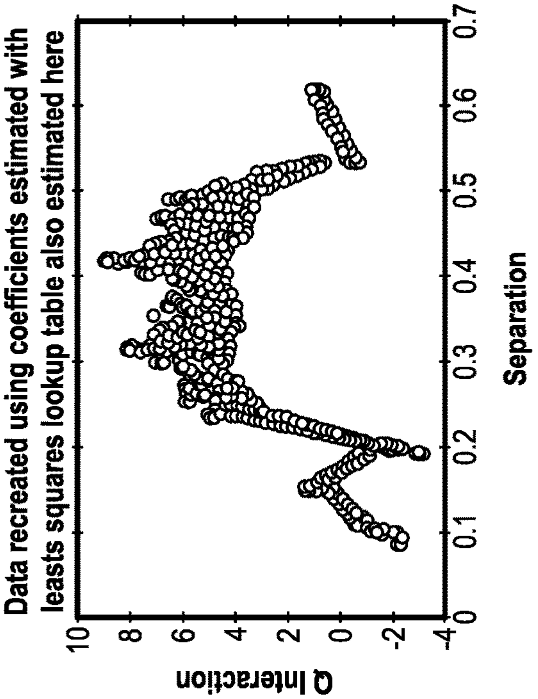
FIG. 6B shows a graph generated using coefficients estimated using the least squares lookup table.
Figure 6C:
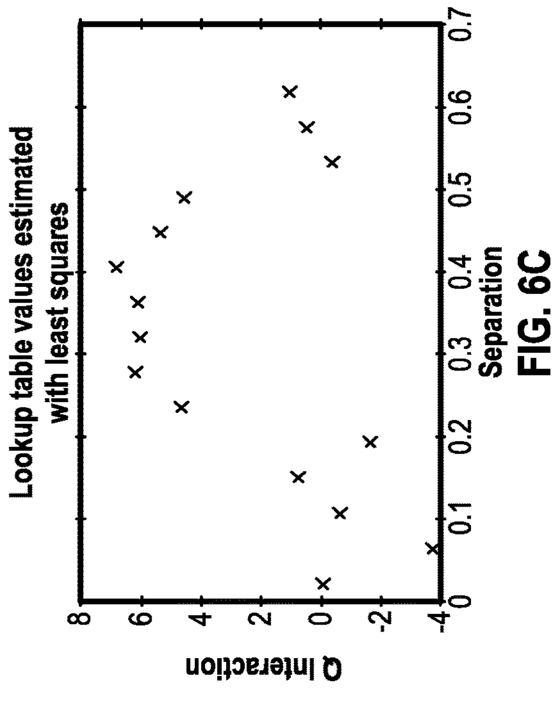
FIG. 6C shows a plot of lookup values versus separation time.
Figure 6D:
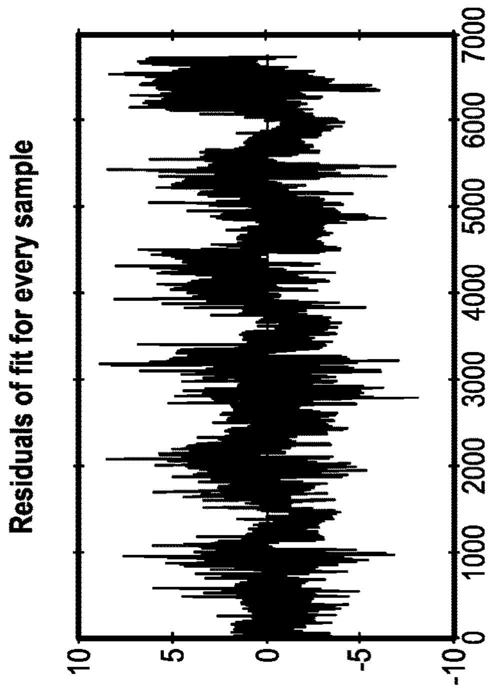
FIG. 6D shows the residual calculated for the fit of every sample.

Referring now to FIGS. 6A through 6D, FIG. 6A shows the experimental data Q interaction plotted as a function of Separation Time (ms). FIG. 6B shows the data estimated using the coefficients estimated using a least squares lookup table of values determined using the methods disclosed above, Q interaction plotted versus Separation Time (ms). FIG. 6C shows only the lookup table values estimated as in the above, Q interaction plotted versus Separation Time (ms). FIG. 6D shows Residuals of fits for every sample collected. A statistical analysis of the residuals for the major variables Quantity of Pilot, Quantity of Main, and Hydraulic Separation demonstrated no obvious un-modeled trends.

Referring now to FIGS. 7A through 7D, plots of residual values versus $Q_p$ (FIG. 7A), $Q_m$ (FIG. 7B), and Hydraulic Separation (FIG. 7C) as well as histogram of the residuals and a Least Squares Fit (LSF) of the Residuals (FIG. 7D) are shown. The sigma ∇ value for the LSF fit is 2.089 mg/stk.

Referring to Table 1, the data is analyzed using a p-value test. The coefficients that account for greater variability have higher p-values. In order to create a robust model, only the coefficients with higher p-values are used to generate a model for the effect of simulations injection events on one another. The p-values for the coefficients are indicated in Table 2.

TABLE 1

P-value test for the coefficients

| Group | N | Mean | 95% CI | StDev | 95% CI | Min | Median | Max | Normality Test P | Normality Test Decision |
|---|---|---|---|---|---|---|---|---|---|---|
| C1 | 6 | 11.171 | (9.4294, 12.913) | 1.6597 | (1.0360, 4.0706) | 9.2935 | 11.175 | 13.362 | 0.583 | Pass |
| C2 | 6 | 5.0514 | (3.5101, 6.5926) | 1.4687 | (0.9168, 3.6021) | 3.2371 | 4.7961 | 7.5403 | 0.661 | Pass |
| C3 | 6 | −0.26118 | (−6E−01, 0.1125) | 0.35604 | (0.2222, 0.8732) | −0.6893 | −0.22816 | 0.20377 | 0.493 | Pass |
| C4 | 6 | 0.85430 | (0.0521, 1.6565) | 0.76437 | (0.4771, 1.8747) | 0.01513 | 0.66243 | 2.2862 | 0.090 | Pass |
| C5 | 6 | −0.28219 | (−6E−01, 0.0667) | 0.33244 | (0.2075, 0.8153) | −0.5569 | −0.38556 | 0.36322 | 0.045 | Fail |
| C6 | 6 | 14.176 | (12.533, 15.819) | 1.5658 | (0.9774, 3.8402) | 12.300 | 14.205 | 16.140 | 0.256 | Pass |
| C7 | 6 | 4.531E−04 | (−8E−03, 0.0094) | 0.0085208 | (0.0053, 0.0209) | −0.0106 | 0.0014466 | 0.013869 | 0.629 | Pass |

TABLE 2

P-value for coefficients, taken from Table 1

| Coefficient # | p-Value |
|---|---|
| 1 | 0.583 |
| 2 | 0.661 |
| 3 | 0.493 |
| 4 | 0.09 |
| 5 | 0.045 |

TABLE 2-continued

P-value for coefficients, taken from Table 1

| Coefficient # | p-Value |
|---|---|
| 6 | 0.256 |
| 7 | 0.629 |

Figure 8:
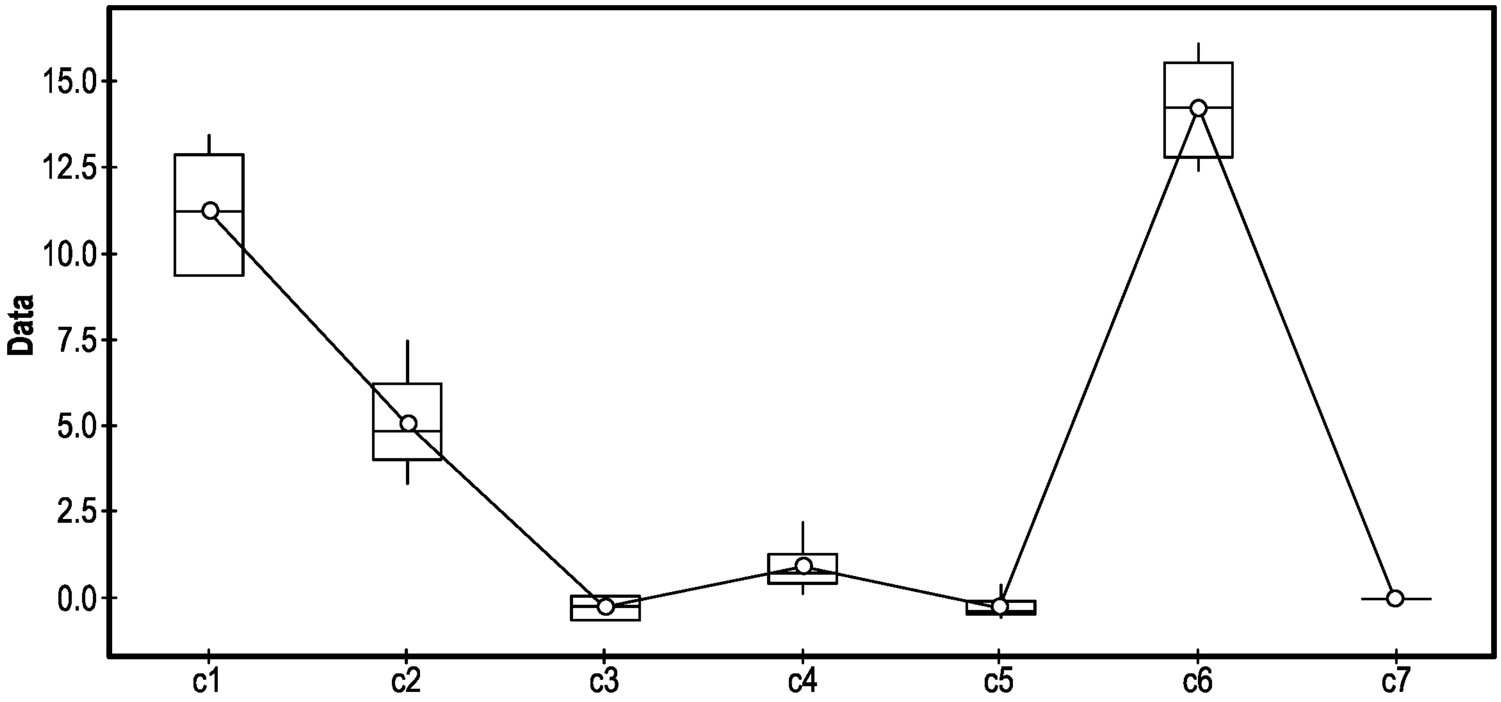
FIG. 8 is a boxplot of coefficients c1, c2, c3, c4, c5, c6, and c7. The Mean, the Standard Deviation, the Minimum, and the Maximum for each of the plotted coefficients is show in tabular form beneath the plot.
Figure 9:
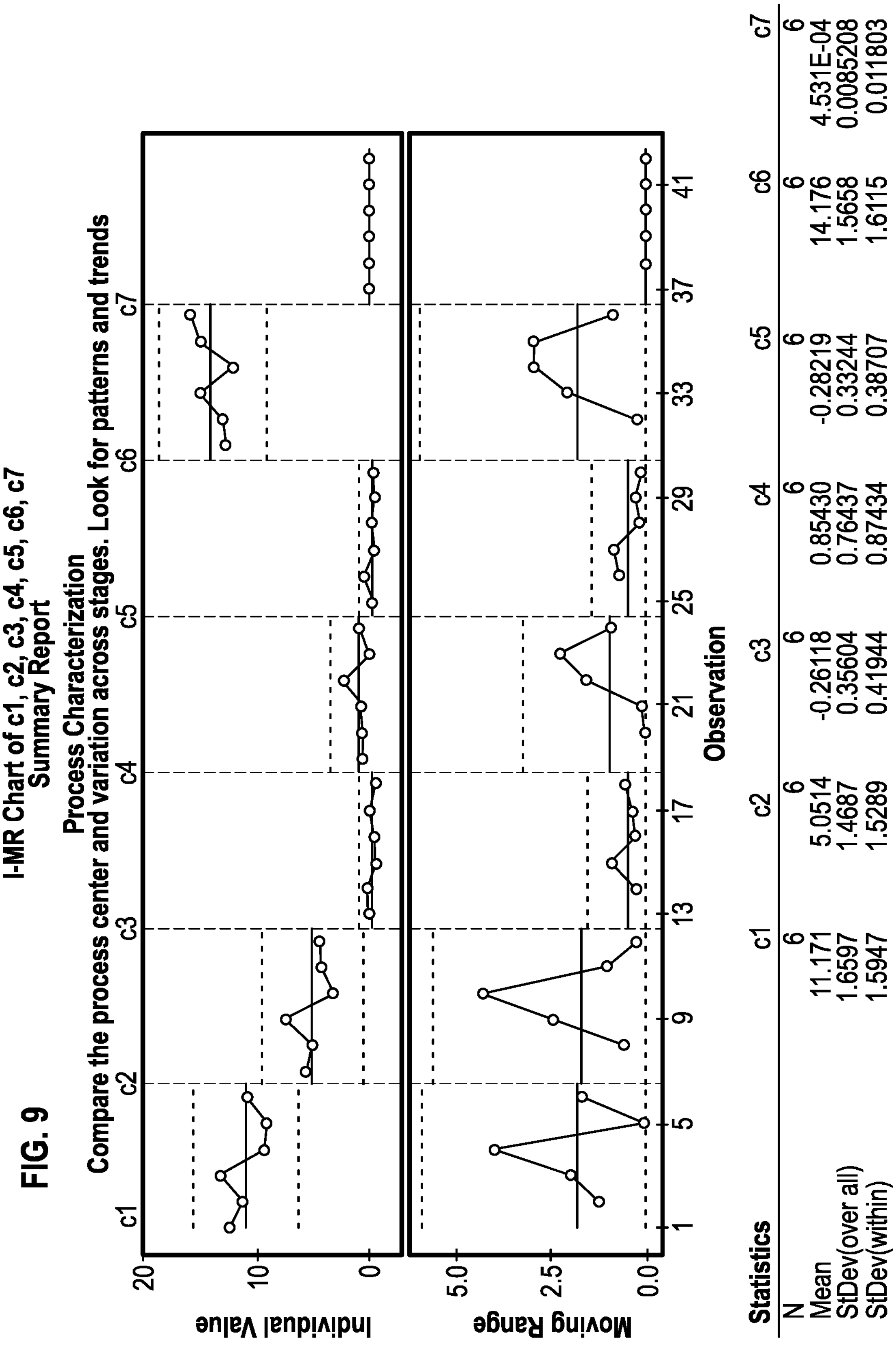
FIG. 9 is an I-MR chart of coefficients c1, c2, c3, c4, c5, c6, and c7. The N value, the Mean, the Standard Deviation overall with respect to each coefficient, and Standard Deviation within each coefficient is show in tabular form beneath the I-MR plot of the coefficients.

Referring now to FIG. 8, the boxplot illustrates the length of the box and the length of the whiskers corresponds to the amount of variation in a given coefficient. Referring now to FIG. 9, an individual and moving range (I-MR) test is performed in which the I-MR chart exhibits the level of variation in each given variable. The results of the tests as referred to in Table 2 (p-value), FIG. 8 (boxplot), and FIG. 9 (I-MR) are compiled such that the weighted results of these tests are summarized in Table 3.

TABLE 3

Compiled results of the three aforementioned tests (p-value, boxplot, and I-MR) performed for the coefficients

| Probability of selection | p-Value | Boxplot | I-MR | Weight |
|---|---|---|---|---|
| Most Probable | 1, 2, 7 | 1, 2, 6 | 1, 2, 4, 6 | 9 |
| Probable | 3, 6 | 4 | 3, 5 | 3 |
| Least Probable | 4, 5 | 3, 5, 7 | 7 | 1 |

| Coefficient # | p-Value | Boxplot | I-MR | Total Score |
|---|---|---|---|---|
| 1 | 9 | 9 | 9 | 27 |
| 2 | 9 | 9 | 9 | 27 |
| 3 | 3 | 1 | 3 | 7 |
| 4 | 1 | 3 | 9 | 13 |
| 5 | 1 | 1 | 3 | 5 |
| 6 | 3 | 9 | 9 | 21 |
| 7 | 9 | 1 | 1 | 11 |

Of all seven (7) coefficients that are analyzed, four (4) of the seven (specifically, Coefficient Nos. 1, 2, 4, and 6 in the example shown) are deemed to be sufficiently high to effectively account for essentially all of the variability in the data and to generate a robust model, and as such these coefficients are chosen for adaptation. Accordingly, the remaining three (3) coefficients (Coefficient Nos. 3, 5, and 7 in the example shown) are treated as constants in the modeling process. A process noise covariance (in the form of a matrix Q 4×4) is created by selecting a dataset collected for a single cylinder. The database is used to estimate the four coefficients chosen for the chosen cylinder. In this example, the process is repeated for all six (6) of the cylinders generating six different sets of data. The covariances for the four coefficients and the six repetitions are computed.

Coefficients related to Gain_Pilot_Qty (Pilot Quantity), Gain_Main_Qty (Main Quantity), and Pressure were chosen for adaption. See Table 4, in which Coefficient Nos. 1 and 2 pertaining to the gain due to pilot quantity, Coefficient No. 4 pertaining to the gain due to main quantity, and Coefficient No. 6 pertaining to the gain due to pressure were chosen.

TABLE 4

Coefficients and the descriptions thereof

| Coefficient # | Description |
|---|---|
| 1 | Gain due to Qp, Pilot quantity |
| 2 | |
| 3 | Gain due to Qm, Main quantity |
| 4 | |
| 5 | |
| 6 | Gain due to Pressure |
| 7 | Offset for horizontal adjustment |

The noise covariance matrix (e.g., a matrix Q-4×4) for the coefficient is chosen for adaptation by the following process: (1) a dataset for a single cylinder is estimated for the selected four coefficients, (2) for a six-cylinder engine, datasets for each cylinder (a total of six datasets) are analyzed, and (3) the covariance between the four coefficients for the six datasets is computed.

Figure 10:
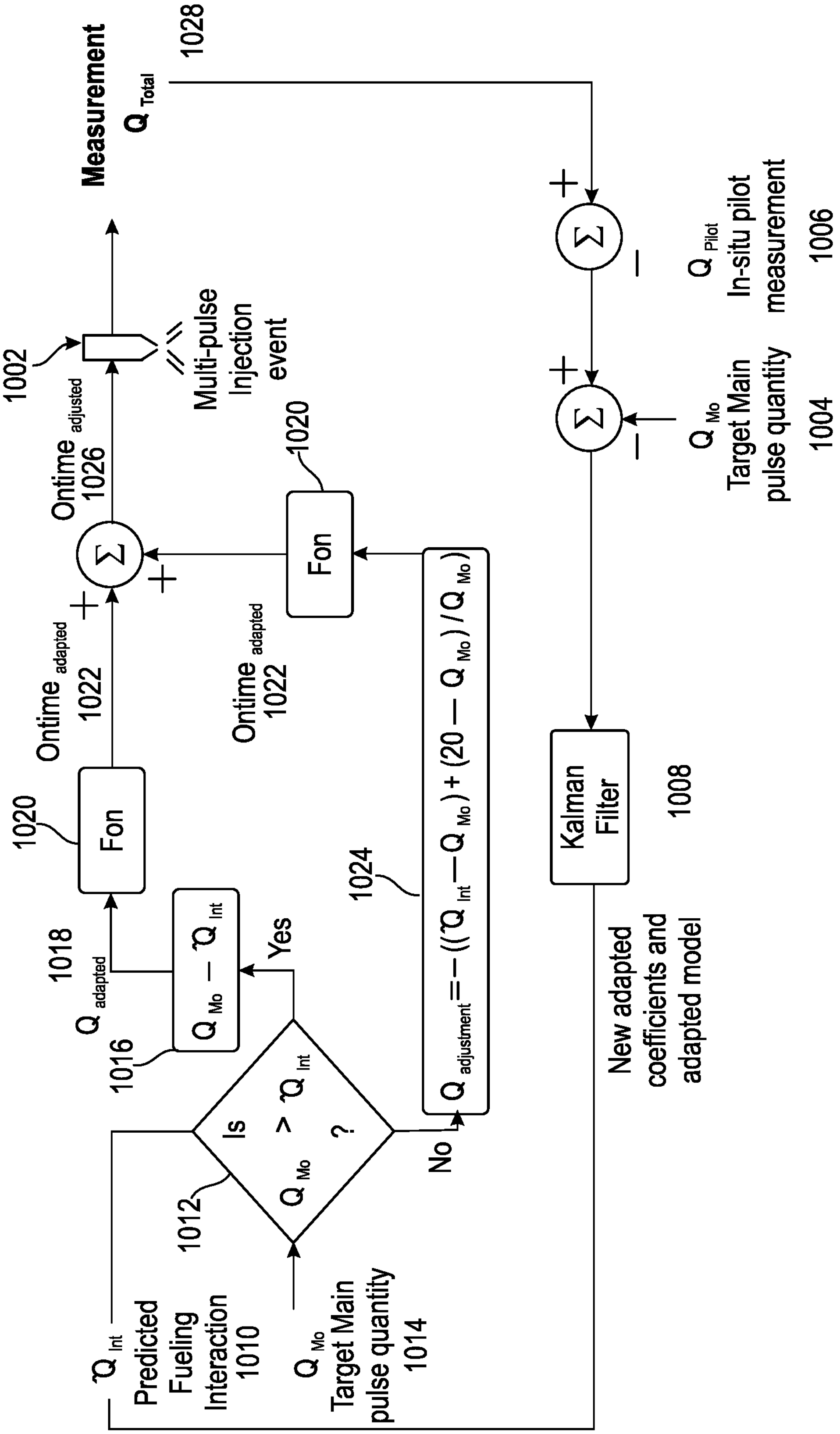
FIG. 10 is a flowchart for the measured delivery of fuel via multipulse injections into an internal combustion engine.

Referring now to FIG. 10, a flowchart is illustrated regarding a process 1000 for regulating the multipulse injection of fuel into an internal combustion engine based on four coefficients identified as sufficient to model the multi-pulse events. The total amount of fuel injected per Multi-pulse Injection Event 1002 is the sum of the quantity of fuel in the Target Main Pulse $Q_{Mo}$ 1004 and the quantity of the fuel in the Pilot Injection measured in situ, $Q_{Pilot}$ 1006. The output of the process is an adjusted multipulse injection event optimized for the timing and the quantity of fuel in the Pilot and Main Injection Events. In order to further refine the relevancy of the coefficients and the predictive integrity of the model the inputs are processed through a Kalman filter 1008. The Kalman filter 1008 filters the inputted interaction values using linear quadratic estimation or joint probability distribution of the interaction values measured over multiple time frames, and subsequently outputs the value of Predicted Fueling Interaction $Q_{Int}$ 1010.

A key decision point in the model is a comparison 1012 of the relative quantities of the Predicted Fueling Interaction $Q_{Int}$ 1010 and Target Main Pulse $Q_{Mo}$ 1014. If $Q_{Mo}$ 1014 is greater than $Q_{Int}$ 1010, the value of $Q_{Int}$ 1010 is subtracted from the value of $Q_{Mo}$ 1014 (shown in block 1016) to generate an adapted quantity $Q_{adapted}$ 1018. Then, $Q_{adapted}$ 1018 is processed through a fuel injection on-time conversion algorithm (FON) 1020 to generate an adapted on-time $Ontime_{adapted}$ 1022, where an "on-time" is defined as an actual time of injection or an interval during which the fuel injector remains open. If $Q_{Mo}$ is not greater than $Q_{Int}$, the following equation (shown in block 1024) is used to determine an adjustment quantity $Q_{adjustment}$:

$$Q_{adjustment} = -\left((Q_{Int} - Q_{Mo}) + \frac{(20 - Q_{Mo})}{Q_{Mo}}\right), \qquad \text{(Equation 6)}$$

after which $Q_{adjustment}$ is processed through the FON 1020 to output an adapted on-time value $Ontime_{adapted}$ 1022. The values of $Ontime_{adapted}$ 1022 are converted to produce the output $Ontime_{adjusted}$ 1026 which is used to regulate the parameters of the Multipulse Injection Event 1002. Afterwards, total fueling measurement, $Q_{total}$ 1028 is then taken and used as input in the next cycle of the process 1000.

Figure 11:
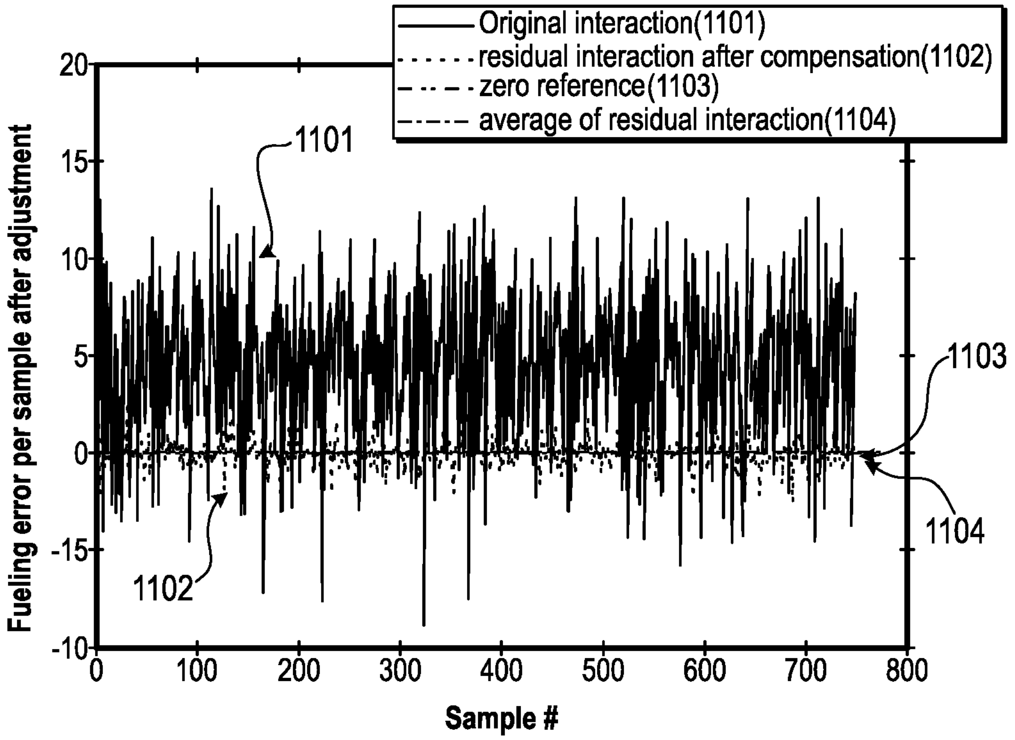
FIG. 11 is a plot of the fueling error per sample determined after adjustments to the multipulse event based on the simulation (y-axis) versus each sample (x-axis) determined at a fuel rail hydrostatic pressure of 500 bar.

The ability of the model to reduce the fuel penalty caused by interactions between pilot and main fuel injection pulses is assessed. The adjusted on-time fueling quantity is compared to the adjusted fueling quantity, (Adjusted Fueling–(Total Fueling–Predicted Interaction)), determined at a fuel rail hydrostatic pressure of 500 bar. Referring now to FIG. 11, a plot is shown of the fueling error per sample determined after adjustments to the multipulse event based on the simulation (y-axis) versus each sample (x-axis). The error was markedly larger for original interactions between pilot and main pulses (green line, 1101), than is the residual interaction after compensation (blue line, 1102). For reference, FIG. 11 includes a line indicating the idealized interaction, i.e., the x-axis where fueling error per sample is zero (black line, 1103). A measure of the average residual interactions between pulses after adjustment is also shown on the same plot (red line, 1104).

Figure 12:
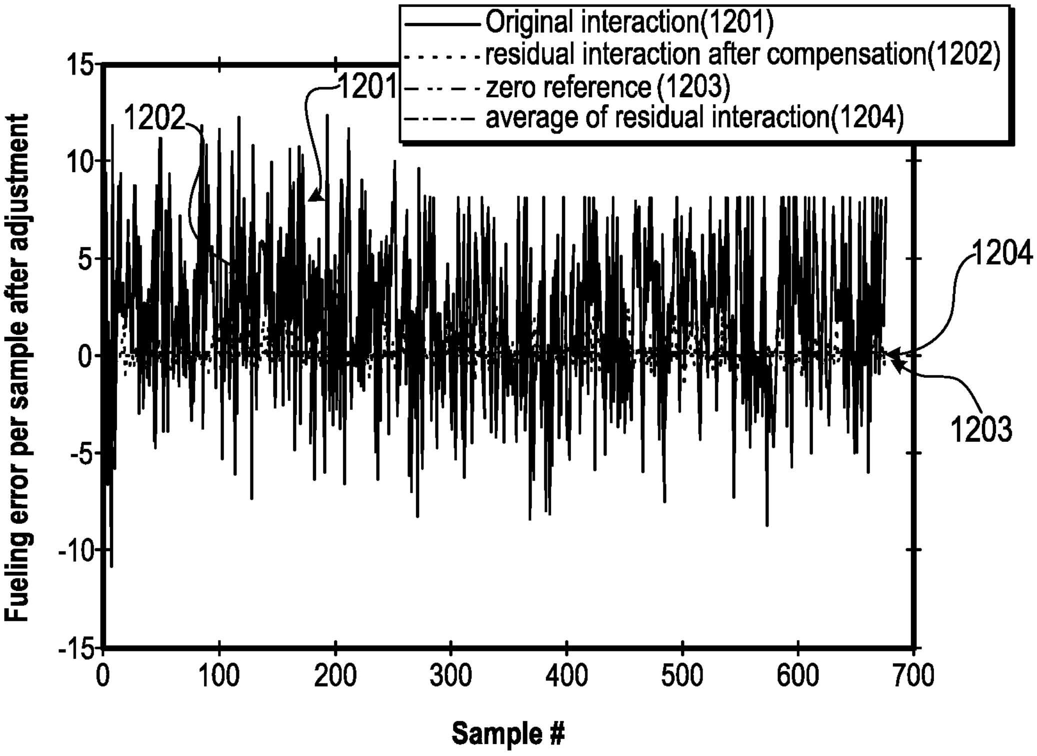
FIG. 12 is a plot of the fueling error per sample determined after adjustments to the multipulse event based on the simulation (y-axis) versus each sample (x-axis) determined at a fuel rail hydrostatic pressure of 1500 bar.

A further test the veracity of the simulation is conducted by comparing the Adjusted on-time fueling quantity to the adjusted fueling quantity (Adjusted Fueling–(Total Fueling Predicted Interaction)) determined at the fuel rail hydrostatic pressure of 1500 bar. Referring now to FIG. 12, a plot is shown of the fueling error per sample determined after adjustments to the multipulse events based on the simulation (y-axis) versus each sample (x-axis). The error was markedly larger for original interaction between pilot and main events (green line, 1201), than is the residual interaction after compensation (blue line, 1202). For reference, FIG. 12 includes a line indicating the idealized interaction, i.e., the x-axis where fueling error per sample is zero (black line, 1203). A measure of the average residual interactions between pulses after adjustment is also shown on the same plot (red line, 1204).

Analysis of the data represented in FIGS. 11 and 12 shows that adjusting fuel delivery parameters based on the inventive model results in an average 76% reduction in interactions between pulses in multipulse fueling events.

Figure 13:
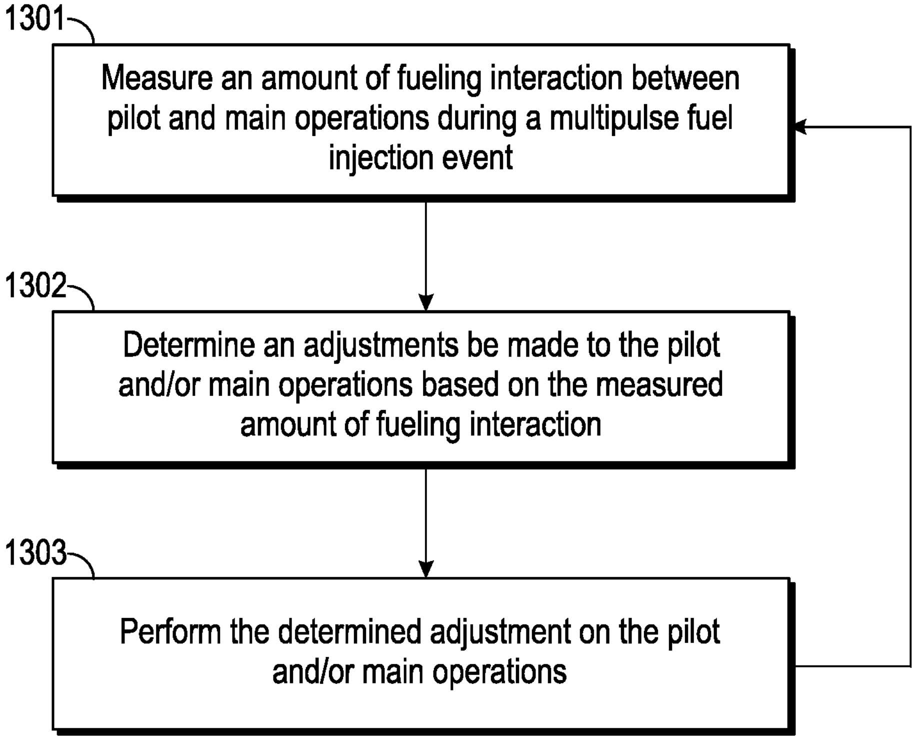
FIG. 13 is a flow chart illustrating a method according to embodiments disclosed herein.

FIG. 13 shows a method for how the algorithm shown in FIG. 3 operates according to some embodiments. In step 1301, the algorithm, or more specifically a processing unit (such as a central processing unit, system-on-a-chip, or any other suitable computing device) of the fuel injection system operating according to the algorithm, measures an amount of fueling interaction between the pilot and main operations during a multipulse fuel injection event. That is, the algorithm measures the amount of interaction the pilot operation has on the main operation and records the time interval between the pilot operation and the main operation. Then, in step 1302, the algorithm determines the amount of adjustment needed to be made in the next pilot and main operations in the multipulse fuel injection event to compensate for the fueling interaction. This determination is made by inputting measurements such as injection characteristics of each individual injector, the fueling interaction, the rail pressure and temperature, as well as the commanded on-times and separations between operations, for example.

In step 1303, the processing unit performs the determined adjustment as outputted by the algorithm. For example, the adjustment may include increasing the separation between the pilot operation and the main operation by a certain value as determined by the algorithm. In some examples, the adjustment may also include changing the actual fuel quantity delivered during each operation. In some examples, the algorithm incorporates a lookup table that determines how much fueling interaction there is for an indicated separation between the pilot and main operations/pulses. The lookup table may be modified or adapted depending on the injection characteristics and/or operating conditions of the injectors. The algorithm also uses a fueling interaction model involving multipulse injection events, where one or more of the initial pressure, commanded pulse separation, commanded pilot quantities, or main quantities may be inputted. After step 1303, the algorithm returns to step 1301 to measure the amount of fueling interaction again to observe whether the previously determined adjustment is effective in reducing the fueling interaction.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method for optimizing fluid injection into an engine via a common rail system, comprising:

determining, by a processing unit, a fueling interaction quantity indicating an amount of fueling interaction between a pilot pulse and a main pulse of a multipulse fuel injection event;

determining, by the processing unit, an adjustment to be made to the pilot pulse or the main pulse using a fueling interaction model involving the multipulse fuel injection event based on the amount of fueling interaction, the determining including (a) in response to a target main injection pulse quantity exceeding the fueling interaction quantity, subtracting the fueling interaction quantity from the target main injection pulse quantity to determine a first adjusted fuel quantity as the adjustment and (b) in response to the target main injection pulse quantity not exceeding the fueling interaction quantity subtracting the target main injection pulse quantity from the fueling interaction quantity and adding an adjustment term to determine a second adjusted fuel quantity differing from the first adjusted fuel quantity as the adjustment; and performing, by the processing unit, the determined adjustment on the pilot pulse or the main pulse.

2. The method of claim 1, further comprising increasing, by the processing unit, a separation between the pilot pulse and the main pulse to allow the sensor to measure the amount of fueling interaction between the pilot pulse and the main pulse.

3. The method of claim 1, wherein the determined adjustment includes a change in fuel quantity to be delivered during the main pulse.

4. The method of claim 1, wherein the adjustment is determined using the fueling interaction model which involves as an input one or more of: an initial pressure, a commanded pulse separation, a fueling quantity of the pilot pulse, or a fueling quantity of the main pulse.

5. The method of claim 1, further comprising adapting the fueling interaction model based on operating conditions and the fueling interaction, the operating conditions including one or more of: an initial pressure, a commanded pulse separation, a fueling quantity of the pilot pulse, or a fueling quantity of the main pulse.

6. The method of claim 1, further comprising temporarily deactivating a pump coupled with the common rail system when the amount of fueling interaction is being measured.

7. The method of claim 1, wherein the fueling interaction model includes a lookup table.

8. The method of claim 1, wherein the amount of fueling interaction is filtered through Kalman filter to produce a predicted fueling interaction value, the method further comprising: comparing, by the processing unit, the predicted fueling interaction value with a target main pulse fuel quantity and determining an adjusted on-time fuel injection.

9. The method of claim 8, wherein when the target main pulse fuel quantity is greater than the predicted fueling interaction, an adapted fuel quantity is calculated by calculating a difference between the target main pulse fuel quantity and the predicted fueling interaction, the adapted fuel quantity is used to determine the adjusted on-time fuel injection.

10. The method of claim 8, wherein when the target main pulse fuel quantity is not greater than the predicted fueling interaction, an adjustment fuel quantity is calculated based on the target main pulse fuel quantity and the predicted fuel interaction, the adjustment fuel quantity is used to determine the adjusted on-time fuel injection.

11. An engine fuel system comprising:

a rail;

a plurality of fuel injectors fluidly coupled to the rail, the fuel injectors configured to inject fuel therefrom;

a control system comprising at least one sensor and a processing unit operatively coupled to the plurality of fuel injectors, the at least one sensor configured to measure an amount of fueling interaction between a pilot pulse and a main pulse during a multipulse fuel injection event, the processing unit configured to:

determine a fueling interaction quantity indicating the amount of fueling interaction between the pilot pulse and the main pulse of the multipulse fuel injection event;

determine an adjustment to be made to the pilot pulse or the main pulse using a fueling interaction model involving the multipulse fuel injection event based on the measured amount of fueling interaction, wherein to determine the adjustment, the processing unit one of (a) in response to a target main injection pulse quantity exceeding the fueling interaction quantity, subtracts the fueling interaction quantity from the target main injection pulse quantity to determine a first adjusted fuel quantity as the adjustment and (b) in response to the target main injection pulse quantity not exceeding the fueling interaction quantity subtracts the target main injection pulse quantity from the fueling interaction quantity and adds an adjustment term to determine a second adjusted fuel quantity differing from the first adjusted fuel quantity as the adjustment; and perform the determined adjustment on the pilot pulse or the main pulse.

12. The engine fuel system of claim 11, wherein the processing unit increases a separation between the pilot pulse and the main pulse to allow the sensor to measure the amount of fueling interaction between the pilot pulse and the main pulse.

13. The engine fuel system of claim 11, wherein the determined adjustment includes a change in fuel quantity to be delivered during the main pulse, and the adjustment is determined using a fueling interaction model which involves as an input one or more of: initial pressure, commanded pulse separation, pilot pulse fuel quantities, or main pulse fuel quantities.

14. The engine fuel system of claim 11, the processing unit further configured to adapt the fueling interaction model based on operating conditions of the plurality of injectors and the fueling interaction, the operating conditions including one or more of: an initial pressure, a commanded pulse separation, a fueling quantity of the pilot pulse, or a fueling quantity of the main pulse.

15. The engine fuel system of claim 11, the processing unit further configured to temporarily deactivate the plurality of injectors coupled with the rail when measuring the amount of fueling interaction.

* * * * *